(12) United States Patent
Gordon et al.

(10) Patent No.: US 7,747,850 B1
(45) Date of Patent: Jun. 29, 2010

(54) AUTOMATED, INTERNET-BASED SECURE DIGITAL CERTIFICATE DISTRIBUTION AND MAINTENANCE

(75) Inventors: Michael E. Gordon, Highlands Ranch, CO (US); Sheryl J. Adam, Littleton, CO (US); James M. Cavanaugh, Cincinnati, OH (US); James D. Osburn, Golden, CO (US)

(73) Assignee: The TriZetto Group, Inc., Greenwood Village, CO (US)

( * ) Notice: Subject to any disclaimer, the term of this patent is extended or adjusted under 35 U.S.C. 154(b) by 1273 days.

(21) Appl. No.: 11/264,891

(22) Filed: Nov. 2, 2005

(51) Int. Cl.
*H04L 29/06* (2006.01)

(52) U.S. Cl. ................................. 713/155

(58) Field of Classification Search .............. None
See application file for complete search history.

(56) References Cited

U.S. PATENT DOCUMENTS

| | | | |
|---|---|---|---|
| 6,055,236 A | | 4/2000 | Nessett et al. |
| 6,611,869 B1 * | | 8/2003 | Eschelbeck et al. ......... 709/228 |
| 7,092,914 B1 * | | 8/2006 | Shear et al. ................... 705/67 |
| 7,392,377 B2 * | | 6/2008 | Ogg et al. ................... 713/153 |

OTHER PUBLICATIONS

Internet Brief: "VeriSign-Security (SSL Certificates), Payments, Communications, Directory Services", http://www.verisign.com/, pp. 1 of 1.
Internet Brief: "Managed PKI Services- Public Key Infrastructures (PKI) from VeriSign, Inc.", http://www.verisign.com/products-services/security-services/pki/index.html, pp. 2.
Internet Brief: "How Digital Certificates Work", http://wp.netscape.com/security/techbriefs/certificates/howcerts.html?cp=stbmid, pp. 2.
Brief: "An Examination of Asserted PKI Issues and Proposed Alternatives", John Linn, RSA Laboratories, Bedford, MA, USA, Mar. 15, 2004.

* cited by examiner

*Primary Examiner*—Pramila Parthasarathy
(74) *Attorney, Agent, or Firm*—King & Spalding LLP

(57) ABSTRACT

A system and method are disclosed for managing bi-directional authentication among two or more users comprising at least one server which distributes security protocol information. The security protocol information may include digital certificates which permit authentication of users. The system and method allow for distribution of security protocol information regarding multiple users to multiple selected users directly from the server. Thus, users do not need to exchange information individually among themselves. The distribution of information may include updates, such as the addition of a new user or the change in the status or protocol information of an existing user. New users with proper privileges may receive protocol information for multiple existing users from a single source.

52 Claims, 3 Drawing Sheets

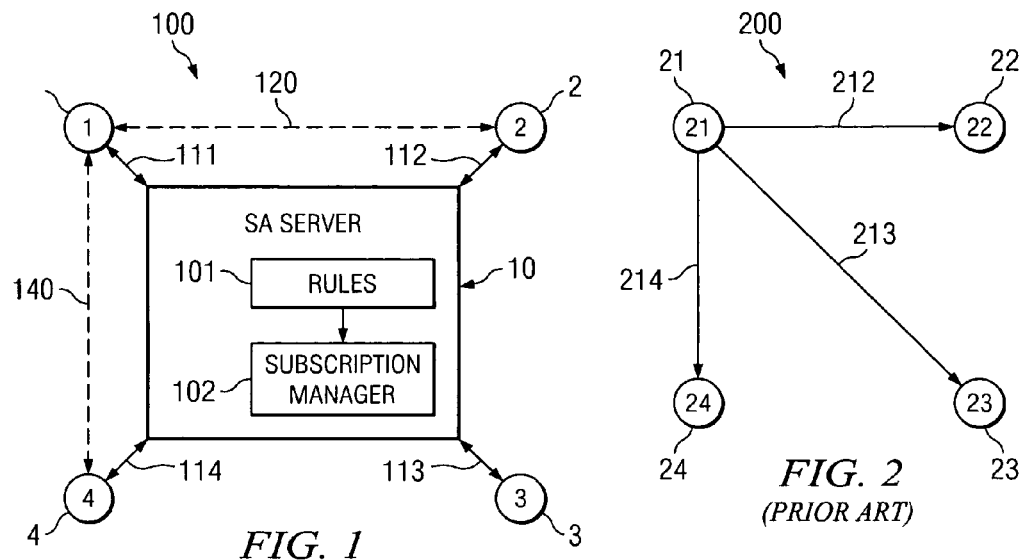
FIG. 1
FIG. 2
(PRIOR ART)
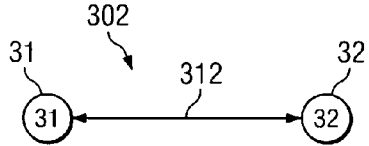
FIG. 3A
(PRIOR ART)
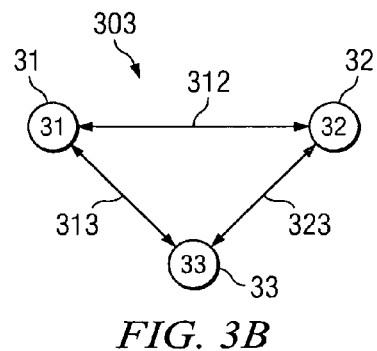
FIG. 3B
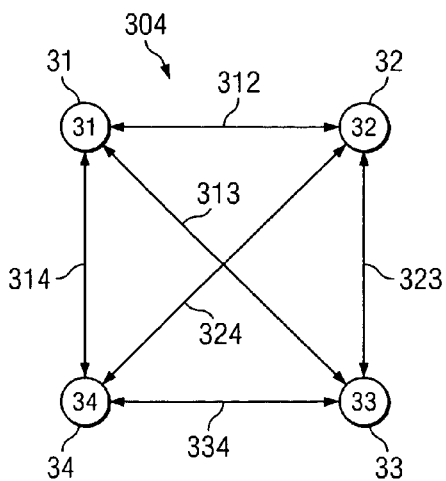
FIG. 3C
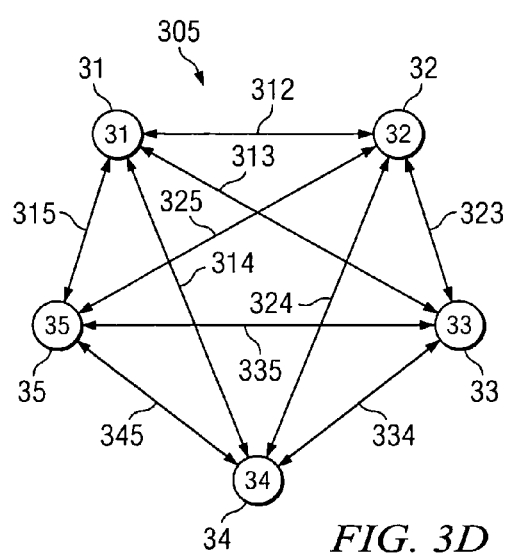
FIG. 3D

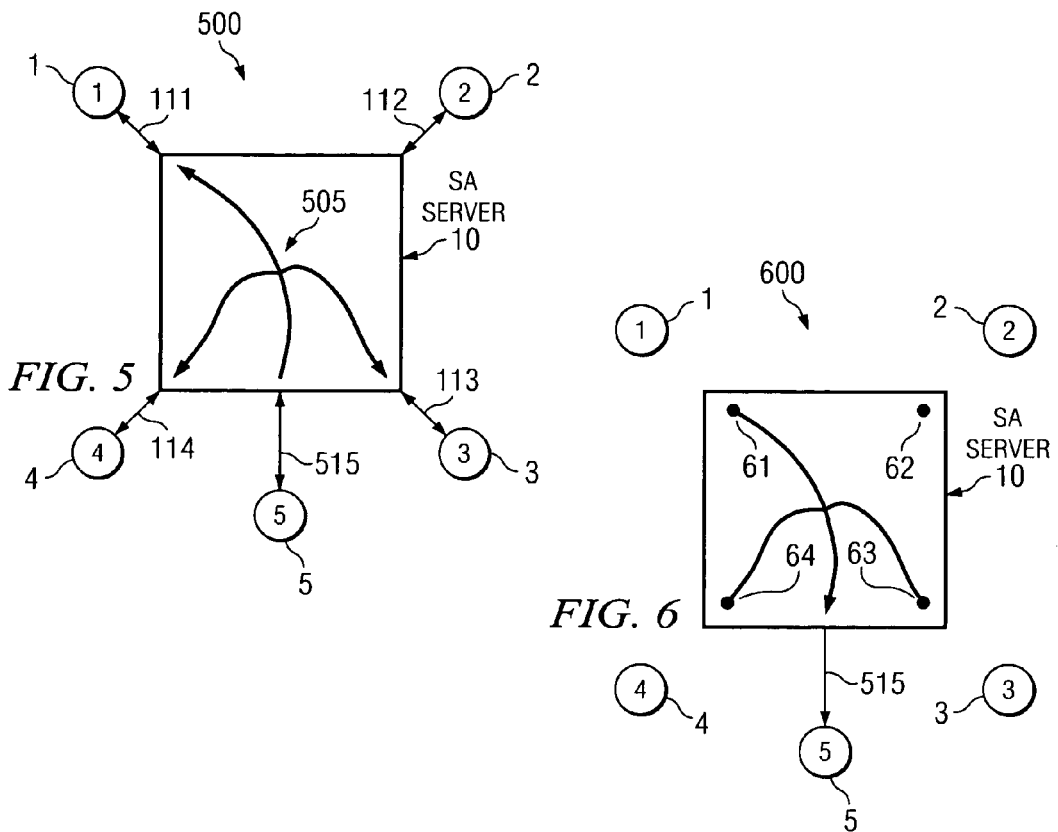
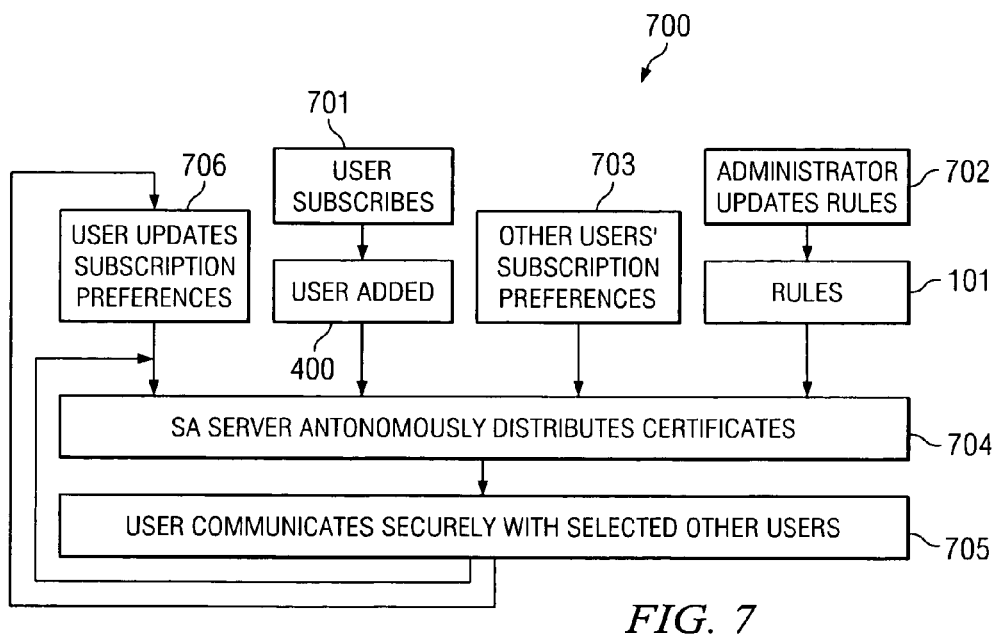

AUTOMATED, INTERNET-BASED SECURE DIGITAL CERTIFICATE DISTRIBUTION AND MAINTENANCE

TECHNICAL FIELD

This invention generally relates to the field of secure communication and more particularly to a system and method for bi-directionally secure communication between pairs of users over a communication network.

BACKGROUND OF THE INVENTION

In many situations, where there is a need to communicate sensitive information, it may be desirable to use a publicly-available communication network. Examples include the exchange of personal, medical and insurance information between various pairings of parties involved in healthcare, such as patients and medical service providers, patients and insurance providers, insurance providers and medical service providers, and service providers at different locations. Providing a secure system that uses a widely-available communication network, such as the interne, would allow for a convenient and efficient exchange of information.

There are three primary aspects of secure communication addressed herein. One is encryption, which provides protection against inadvertent disclosure of information, such as eavesdropping or interception. Another aspect is authentication, which is ensuring that the other party is who it claims to be. Authentication is important in remote communication where the parties cannot see each other and one might be an imposter. A third aspect is data integrity, which is ensuring that the data arriving at the recipient's location is the data that was sent by the original sender. Data integrity prevents substitution or alteration of message contents. As used here, the term secure communication generally includes encryption, authentication and data integrity.

Unfortunately, various forms of communication in widespread use, such as e-mail are generally not secure. Even many websites that bill themselves as "secure" only truly provide one-way security, as discussed below. Without additional measures, such as the exchange of digital certificates, the convenience of using a publicly-available communication network cannot be extended to sensitive information without introducing risks of improper disclosure or impersonation.

One of the challenges to implementing such a system is the technical complexity involved with establishing bi-directionally security with the desired communication partners, such as the creation and exchange of digital certificates. Individuals may lack the skills or other resource, and organizations may lack the proper support staff. Some industries, therefore, remain heavily invested in a paper-based transaction system. Such manual systems, although slow and cumbersome, may be perceived as necessary in order to provide the required levels of security and reliability.

While secure communications are possible over a public network, the level of sophistication required to initialize and administer an appropriately-secure system remains beyond the reach of many network users. Specifically, the difficulties lie in setting up a system and keeping it properly updated with new users, dropped users, and changes to continuing users. Other challenges include a lack of universally-accepted standards for certain types of transaction needs, the cost of current solutions, and the unsuitability of current solutions to bi-directionally secure communications.

Public-key Infrastructure (PKI) has promised to solve many privacy and security problems. It has been touted as the primary mechanism to share an entity's public keys with others, thus allowing the creation of trusted relationships between the entities and the exchange of secure, non-repudiated information. These claims have become controversial because the promise has in many cases not been kept. Some uses, such as informal email certificate exchange and secure FTP (usually PGP) are common, but do not scale, especially on an enterprise scope. Some of the difficulties include:

a. Difficulty of generation and distribution of keys. Difficulty is magnified when trying to implement a system with "low tech" users or users with little experience.

b. The demand for security at this level has not emerged. In many situations, the solutions are over-engineered.

c. PKI is not cost-effective for many applications.

In the white paper "An Examination of Asserted PKI Issues and Pro-posed Alternatives", John Linn, RSA Laboratories, Bedford, Mass., USA, Marc Branchaud, RSA Security Inc. March 2004, the disclosure of which is hereby incorporated by reference, various issues with PKI acceptance are discussed further.

Despite these issues, PKI is in relatively wide-spread use and providing secure communication in certain situations. PKI uses a well-known mechanism called digital certificates. Digital certificates use key pairs: a private key and a public key. An entity's public key may be distributed to anyone who wishes to send encrypted communication to that entity. The recipient of the public key can use the public key to encrypt information that is then sent, possibly via e-mail, to the entity. The entity retains the private key in a safe place, since only a holder of the private key is able to decrypt the communication encrypted with the corresponding public key. Such a system provides both one-way authentication as well as protection from eavesdropping, because an imposter or third party intercepting the communication cannot decrypt it.

Authentication is a verification that the recipient of the communication is the owner of the digital certificate. Anyone can send another entity's digital certificate. But only the holder of the private key for that certificate can decrypt a message sent using the public key. The recipient's ability to decrypt a communication uniquely identifies it as one possessing the private key. This then is the authentication of the recipient's identity. Digital certificates also can be used for data integrity, protecting against both accidental corruption and intentional tampering or substitution. Thus a digital certificate can address the three of the aspects of secure communication mentioned above.

Privacy and authentication can help provide security, but each entity that desires to send information securely must have a copy of each recipient's digital certificate. This is because PKI only provides one-way authentication. For bi-directional authentication, PKI is used to provide one-way authentication in both directions.

One of the challenges in setting up a system for a group of users is the generation and distribution of the digital certificates. Often, one entity with the proper resources may generate the digital certificates for communication partners. Currently, the organizations that generate the key pairs for others have a dilemma: the sensitive information that needs to be sent to a partner (the key pair) will allow for a secure communication channel, but how can any sensitive information, such as the private portion of a key pair, be economically distributed before the secure communication channel is in place?

Some organizations distribute the certificates by mailing them on CD or sending a courier with a CD. Others may actually e-mail the certificates, which exposes them to possible electronic interception and copying, and increases the risk of a security breach. The challenges multiply when a certain entity, such as a medical insurer wishes to communicate securely with its client base and network of medical providers, many of whom may not be technically adept. The size of the group can drive up the costs of physical delivery of the certificates, and insecure e-mail distribution may present unacceptable risks.

There are also challenges in maintaining a secured communication system for a group of users. Several different types of events can happen that require action. If a new entity joins the group, and needs to communicate with others, the new entity must not only obtain the certificates of the existing users, but also distribute its own certificate. Also, one of the users may be dropped from the system, based on either voluntary withdrawal or involuntary termination. In the latter case, some arbitrator would need to inform the remaining users that a particular entity can no longer be trusted. Further, existing users may wish to periodically change their certificates either as a precaution or in response to a security breach. In such a case, the user changing the certificate would need to inform all other users not to use the previous certificate.

Digital certificates generally have expiration dates. However, due to the expense and effort involved in re-issuing certificates, many organizations set the expiration date far into the future to delay required update. This generally goes against what many security-conscious organizations regard as "best practices."

One security solution that has emerged for some retail situations is third-party certification, such as is provided by VeriSign. One notable user of VeriSign's service is Amazon.com. However, for multiple reasons, this solution does not fully address the needs mentioned above for bi-directionally secure communication, such as what is needed for the exchange of healthcare information. First, the security offered is only one-way authentication. That is, Amazon.com's customers can trust that they are sending their orders and credit card information to Amazon.com or a designated transaction handler, but Amazon.com cannot use VeriSign to verify the identity of the customers.

One-way authentication for a retailer is not entirely problematic. Ordering books or bidding on merchandise using another person's name does not have the same significance as updating or accessing private medical or financial information using another person's name. Retailers using the one-way authentication may require a username, password or secret question for customer accounts, but these may not provide the level of security required for more sensitive information.

As consumers and organizations increase their use of the internet for information exchange, the desire for bi-directionally secure communications will increase. This is particularly the case as consumers do more management of their own healthcare information, selection of plans and access of their personal health records via a web browser. The security offered by a unique digital certificate, that can authenticate their interaction, can provide a level of security beyond what is offered by usernames, passwords and secret questions. One benefit of using bi-directionally secure communication over the internet is that the patient can be assured that the doctor is the one receiving the information, and the doctor can be assured that the information is actually coming from the patient. In order to breach the system, one would have to physically possess the private key material.

Therefore, there exists a need for a system that can provide authentication information, such as a private and public key pair, and distribute and maintain such information in an efficient, timely and user-friendly manner.

BRIEF SUMMARY OF THE INVENTION

The present invention is directed to a system and method for managing bi-directional security, including bi-directional authentication, among two or more users. In one embodiment, at least one server distributes security protocol information. The security protocol information may include digital certificates which permit authentication of users in addition to encryption. The system and method allow for distribution of security protocol information regarding multiple users to multiple selected users directly from the server. Thus, users do not need to exchange information individually among themselves. The distribution of information may include updates, such as the addition of a new user or the change in the status or protocol information of an existing user. New users with proper privileges may receive protocol information for multiple existing users from a single source.

An automated setup process for the deployment and administration of digital certificates allows even non-technically adept individuals to participate in secure communication over a communication network, such as the internet. In one embodiment, the automation is set up in an enterprise manner that does not require a single, central hub or core repository. Third-party certification, such as that provided by VeriSign, is unnecessary because the distribution and maintenance of certificates is handled by the trusted system.

Bi-directionally secure communication may use two relatively independent one-way schemes, one operable in each direction, or a fully-integrated bi-directional system in which the security in each direction is fully dependent on the security in the opposite direction. The present invention is capable of managing the information distribution to accommodate any degree of independence or integration. Other possible users besides the medical industry mentioned above include the legal industry and software hosting services, as examples. Of course, any peer-to-peer system in which bi-directionally secure communication is desired between a group of users could also benefit, such as internal communication by an organization's employees.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 shows a block diagram of an embodiment of the invention.

FIG. 2 shows one use case of a prior art technique for providing one-way authentication.

FIGS. 3A-3D show four use cases of prior art techniques for providing bi-directionally secure communication, which require two-way manual certificate exchanges.

FIG. 5 shows the path of a certificate during the introduction or update of a user.

FIG. 6 shows the path of existing users' certificates during the introduction of a new user.

FIG. 7 shows a method for communicating securely using an embodiment of the present invention.

DETAILED DESCRIPTION OF THE INVENTION

Figure 4:
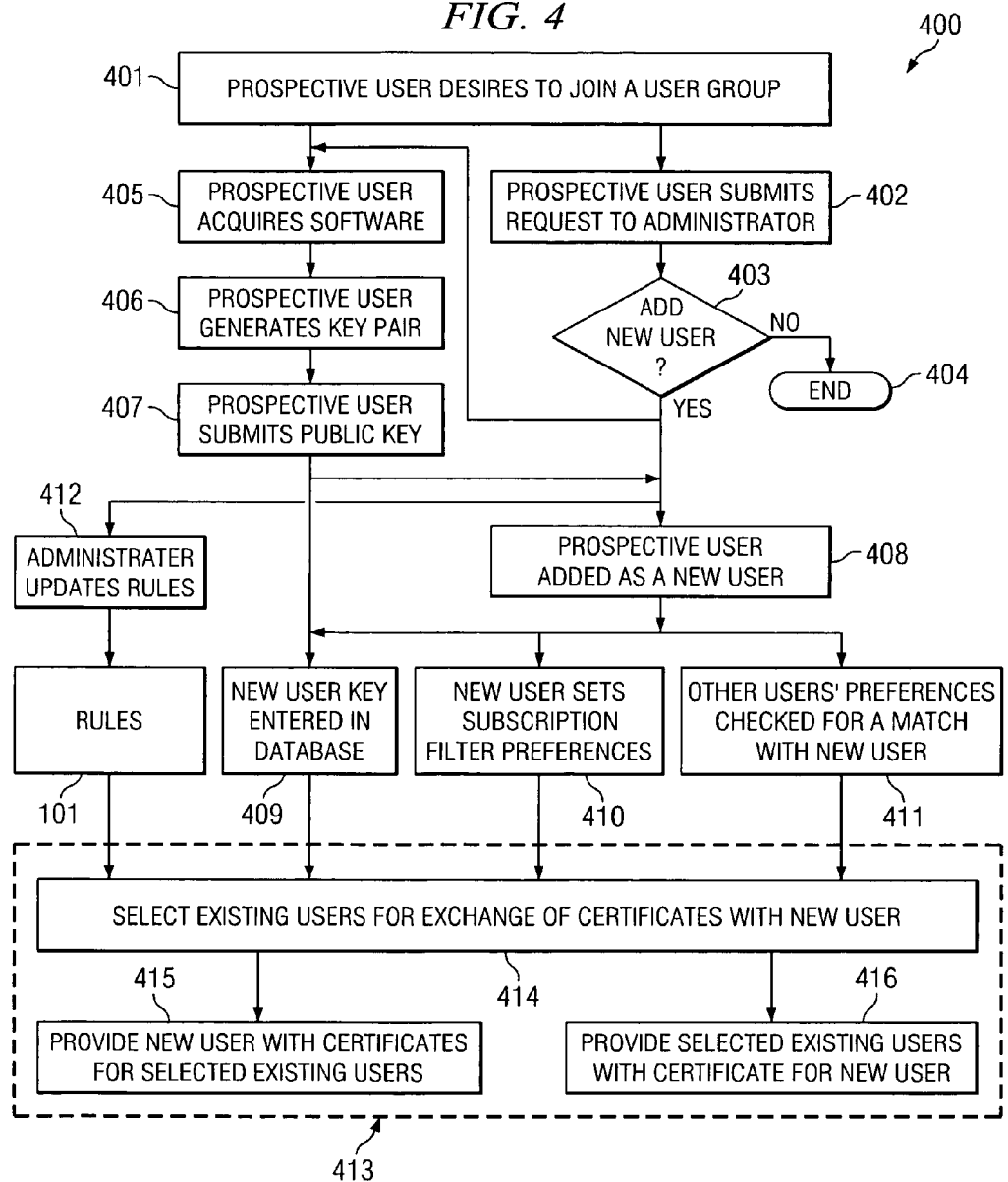
FIG. 4 shows an exemplary method for adding a new user according to one embodiment of the present invention.

FIG. 1 shows a block diagram of an embodiment of the invention. Bi-directionally secure communication system 100 comprises security administration (SA) server 10, users 1, 2, 3 and 4, along with bi-directionally secure communication links 111, 112, 113 and 114 connecting SA server 10 to each of users 1, 2, 3 and 4, respectively. SA server 10 automatically manages the distribution of security information to each user for all other users that are to be paired with that particular user. For example, if user 1 desired to communicate with users 2 and 4, SA server 10 would provide user 1 with digital certificates or other relevant information for each of users 2 and 4. SA server 10 would then provide each of users 2 and 4 with the relevant security information for user 1. While only four users are shown for illustration purposes, any number of users may be present in other implementations.

Communication links 111, 112, 113 and 114 may be interne connections, and are used to link users 1, 2, 3 and 4 to SA server 10 for the purpose of managing security information exchanges. Users 1, 2, 3 and 4 may communicate with each other over other channels, such as 120 and 140, that do not need to involve SA server 10. SA server 10 comprises rules 101 and subscription manager 102. Rules 101 control the operation of SA server 10 and subscription manager 102 to determine information routing, such a verifying that a certificate exchange between certain users should be allowed. Subscription manager 102 matches user pairs for the automated information exchange, based on rules 101 and user subscription preferences.

FIG. 2 shows one use case of a prior art technique for providing one-way authentication. One-way authentication system 200 comprises users 21, 22, 23 and 24, along with one-way authenticated communication links 212, 213 and 214 connecting user 21 to each of users 22, 23 and 24 respectively. User 21 is authenticated to users 22, 23 and 24, but users 22, 23 and 24 are not authenticated to user 21. That is, users 22, 23 and 24 may have confidence that they are communicating with user 21, but user 21 does not have the same degree of confidence that users 22, 23 and 24 are truly who they claim to be. One-way authenticated systems often use a trusted third party to distribute the certificates, the way Amazon.com uses VeriSign.

FIGS. 3A-3D show four use cases of prior art techniques for providing bi-directionally secure communication, which require two-way manual certificate exchanges. Manual system 302 of FIG. 3A comprises users 31 and 32 with a manual two-way certificate exchange 312 between users 31 and 32. Users 31 and 32 may exchange their certificates via regular mail, courier, e-mail or any other method they choose. Manual system 303 of FIG. 3B adds a single user 33 to system 302, but requires two more manual two-way certificate exchanges, 313 and 323, between user 33 and users 31 and 32, respectively. Manual system 304 of FIG. 3C adds another user 34 to system 303, but requires three more manual two-way certificate exchanges, 314, 324 and 334, between user 34 and users 31, 32 and 33, respectively. Manual system 305 of FIG. 3D adds a single user 35 to system 304, but requires four more manual two-way certificate exchanges, 315, 325, 335 and 345, between user 35 and users 31, 32, 33 and 34, respectively.

In general, a manual system with N users will require $(N^2-N)/2$ two-way certificate exchanges. Thus, a system with 100 users will require 4,950 two-way certificate exchanges. Manual systems have the further disadvantage of requiring users to identify each other and coordinate the exchange of certificates. This is inefficient and particularly difficult for users that are not technically adept. Additionally, users who do not understand how to properly exchange certificates may introduce either further delays or security risks.

FIG. 4 shows an exemplary method for adding a new user according to one embodiment of the present invention. The user initialization process 400 begins in block 401 with a potential user desiring to join a user group and participate in bi-directionally secure communication with other members of that group. The potential user makes a request, in block 402, to an administrator authorized to add users. The request may be submitted electronically, such as through a website. The administrator, acting as a gatekeeper, decides in block 403 whether the potential user should be allowed to join a particular group or groups. This decision could include factors such as the potential user's need to communicate and role in the group, along with the administrator's trust in the potential user. If not, the process terminates in block 404. If, however, the administrator decides to add the potential user, appropriate software is made available, in block 405, for the potential user to generate a key pair in block 406. There are multiple possible methods for the potential user to receive the software, such as downloading it from a website or the administrator mailing the software on CD.

The public key of the newly generated key pair is submitted to the administrator in block 407, and the potential user is added as a new user to the approved group or groups in block 408. As a result of this addition, different activities take place that will allow proper distribution of the certificates in block 413. The new certificate is entered into a database in block 409, the new user sets subscription preferences in block 410, and other users' subscription preferences are checked in block 411 for a match with the new user. The administrator updates rules in block 412 to accommodate the new user. The updates could include prohibitions on certificate exchanges with certain other users. Then, using rules 101 along with the new user's and existing users' subscription preferences, subscription manager 102 selects existing users to match with the new users for an exchange of certificates in block 414. The new user is provided with the certificates of the selected existing users in block 415, and selected existing users are provided with the certificate of the new user in block 416.

FIG. 5 shows the path of a certificate during the introduction or update of a user. During introduction/update 500 of the certificate for user 5, users 1, 3 and 4 receive the new certificate. This is because either users 1,3 and 4 meet the subscription preferences of user 5, user 5 meets the subscription preferences of users 1,3 and 4, or rules 101 create the pairings. User 2 does not receive the certificate of user 5, because user 2 and user 5 did not meet either of the other's subscription preferences, or else rules 101 prevent an exchange. Rather than using manual two-way certificate exchanges similar to 315, 335 and 345 of prior art manual system 305 in FIG. 3D, user 5 merely needs to send the certificate once through communication link 515 to server/publisher 10. Alternatively, an administrator may generate the certificate and distribute the proper portions to both user 5 and SA server 10. SA server 10 makes routing distribution plan 505 that excludes a path to non-selected user 2. Users 1, 3 and 4 receive the new certificate through bi-directionally secure communication links 111, 113 and 114, respectively. If the certificate for user 5 is updated, the new certificate is distributed similarly to process 500, but including information for the other users to replace rather than add a certificate.

FIG. 6 shows the path of existing users' certificates during the introduction of a new user. During introduction 600 of new user 5, new user 5 receives certificates 61, 63, and 64 for each of users 1, 3 and 4, respectively. This is because either users 1,3 and 4 meet the subscription preferences of user 5, or else user 5 meets the subscription preferences of users 1,3 or 4. User 5 does not receive certificate 62 of user 2 because either user 2 and user 5 do not meet either of the other's subscription preferences, or rules 101 prevent a pairing. Rather than using manual two-way certificate exchanges similar to 315, 335 and 345 of prior art manual system 305 in FIG. 3D, user 5 automatically receives all of certificates 61, 63 and 64 through communication link 515 with server/publisher 10. SA server 10 has access to copies of certificates 61, 63 and 64, which frees users 1, 3 and 4 from being required to participate in furnishing user 5 with copies of their respective certificates. Note that any of users 1, 2, 3 and 4 could have requested an administrator to update rules 101 to prevent an exchange of keys with new user 5.

FIG. 7 shows a method for communicating securely using an embodiment of the present invention. The communication process 700 begins in block 701 with a user subscribing to the system. The user is added in block 400, as shown in FIG. 4. An administrator updates rules 101 in block 702. The updating in block 702 is a continuous activity, and rules 101 are subject to frequent changes. Other users' subscription preferences are checked in block 703. This is also a continuous activity, because the other users' preferences are also subject to frequent changes. SA server 10 autonomously distributes certificates to the user, in block 704, at times determined by SA server 10. These could be regular intervals, each time the user logs onto SA server 10, or whenever there is a change affecting the user. The user is now able to communicate securely with selected other users in block 705. The user will automatically receive updates from SA server 10, cycling between blocks 704 and 705, and can optionally update subscription preferences in block 706.

In general, subscription manager 102 operates under control of rules 101 to distribute certificates or other security protocol information in accordance with user subscription preferences. User subscription preferences could specify filters, such as location or name. Upon specification of such filters, subscription manager 102 matches a user with any others fitting the description, allowing for an automatic two-way exchange of keys without that user needing to arrange for key exchanges individually. For example, if user "A" entered the secure network, or else changed subscription preferences, user A could automatically receive the security protocol information for all of the other selected users. The other selected users could then receive the information for user A. Or, perhaps a newly-added user A meets the subscription preferences of other existing interested users. Upon user A's introduction into the network, those other interested users could automatically receive the protocol information for user A, and user A could likewise receive the protocol information for the other interested users.

Additionally, rules 101 may either match user A to other users allowing for the exchange of information, prevent a match, or else in other circumstances might inform other users to revoke trust in user A. The purpose for such a removal action is similar to a Certificate Revocation List (CRL) currently in use with many PKI systems. On their own, CRLs have generally proven to be difficult to administer. The automated features of embodiments of the current invention, however, can provide assurance that a revocation is disseminated.

Also, a user may desire to change the digital certificate periodically for precautionary measures, or else in response to a suspected theft of private key material. The user is then able to do so, free of the burden of having to then initiate exchanges with all currently trusted partners.

Two of the ways to use this bi-directional security are with web browsers, where a user is entering or accessing information from a web page, and in information exchange between entities that need an encrypted communication channel. For the web page use, a service provider may provide the means to access, update or enter information via a web page. The service provider may believe that the currently widespread scheme of a simple username and password does not provide the proper level of authentication of the website visitor. However, even if a webpage is not needed, and information is merely exchanged via electronic mail, the recipient may wish to authenticate the source of the message, and the sender may wish to encrypt the message contents.

The system may also use an optional authentication scheme at the user's location, wherein the user requires a username, password or secret question to be privileged to access the more secure protocol information. Other authentication schemes could include verification of the conditional of a physical item, such as biometric data of the user or the validity of a dongle. Such an extra authentication scheme could reduce the risk of user impersonation in the event that a device containing the more secure protocol information was stolen. For example, if a retina scan was required to access the private key, then someone who stole the computer containing the private key would have added difficulty accessing the key.

The example above describes using physical items for local authentication to the system and a digital certificate for external authentication with other users. However, the system could also use authentication methods other than digital certificates, such as dongles, retina scans, fingerprints or other biometric data for the external authentication information used with other users.

It should be noted, though, that once a pair of users has exchanged digital certificates using the present invention, based on how the digital certificates were stored on their machines, the users may make traditional use of the certificates. Such traditional use could include such as sending e-mails using only common software tools and without further accessing the present invention. Additionally, embodiments of the present invention can make use of user groups, such that a user's subscription preferences only trigger exchanges for other users within the group or groups to which that user has access. Some users with administrator privileges would then be able to set up groups and add users to specific groups. Further, there could be levels of administrative privileges, in which some administrators could create and delete groups, where others could only add or delete common users in the existing groups.

Certain embodiments of the present invention also allow for a gatekeeping function for new and current users. A single administrator, perhaps with other designated administrators, could examine the request from a prospective new user that desires to join the system. That is, rather than a new user simply logging into the system, receiving keys, and having its key distributed, the new user may be subject to scrutiny and a waiting period. The new user could generate a key pair locally and connect to the system to request inclusion in a user group or have a certificate generated elsewhere and delivered. An administrator would make a determination of whether the new user should be added to any particular groups, before any certificates are exchanged with existing users. Also, an existing user could be subject to removal from the system and other users' records, even over the removed user's objections.

In one embodiment of the invention, SA server 10 is referred to herein as an Enterprise Security Administration (ESA) server, and is communicatively accessible to a group of subscribers. Users within the group of subscribers desire to communicate securely with one another, and ESA server 10 manages distribution of the appropriate security protocol information among the users. ESA server 10 may be implemented as a centralized server or a plurality of distributed servers.

In general, ESA 10 comprises a software application that manages the creation, storage, and access of authentication and authorization data, the management and distribution of certificate data, and the integration of these functions with 1) DirecLink Client software, 2) "clientless" connectivity methods such as Web Browsers, Web Services, etc. and 3) custom written or 3rd party software applications. ESA 10 manages user IDs, passwords and user roles. In one embodiment, ESA 10 creates RSA key pairs (e.g. PKI key pairs) and X509 certificates for each user ID. A user can be authenticated by his user ID and password, as well as his X509 certificate. ESA 10 can be used in both ways.

According to one embodiment, ESA 10 is a stand-alone process that maintains its own data store, wherein data in the data store is encrypted using one or more multiple schemes to ensure security. All sensitive user data, such as passwords and keys are encrypted. Further, certain embodiments of ESA 10 provide solutions to issues with PKI described in the white paper "An Examination of Asserted PKI Issues and Pro-posed Alternatives" by John Linn, introduced above:

1. Difficulty in Retrieving Keys and Certificates. Embodiments of ESA 10 may provide a simple API to create/modify/delete RSA key pairs associated with User IDs. Users of ESA 10 need not know about encryption or digital signatures, as ESA 10 is packaged with Java streaming software (iSecure) that allows programmers to use Java streams, as opposed to the complicated Cryptography interfaces.

2. Questionable Value of Certified Key Representations. Embodiments of ESA 10 may support customer/programmer selection of certificates for trust relationships, as well as a User Interface to manage them. Such embodiments of ESA 10 do not require external third-party certification, as it creates and manages these keys completely internally. External keys can be imported, if desired.

3. Certificate Processing Complexity. Embodiments of ESA 10 may provide an easy-to-use set of classes that make encryption and digital signatures as easy as using Java streams. The only things the programmers need know are passwords and the well-known name of the entity to whom they want to communicate.

4. Costly Certificates. Embodiments of ESA 10 may manage all key pairs, thus external signing by Certificate Authorities is unnecessary.

5. Problematic Cross-Domain Trust Management. Embodiments of ESA 10 may manage these relationships through its GUI or API to allow customers to set up trust relationships in an easy, intuitive manner.

6. Naming Semantics. Embodiments of ESA 10 may be neutral in this area, without enforcing a standard format for distinguished names.

7. Use with Insecure Clients. In some embodiments, key pairs are stored in the ESA 10 cache with several levels of encryption. While an entity's password is required, it is not enough to access its key pairs.

8. Privacy Compromises. Embodiments of ESA 10 may be neutral on this issue, other than as mentioned above. Customers can elect to chose names that do not expose any sensitive information but allows other entities to identify them.

Authentication is generally defined as assuring that an entity is who it claims to be. ESA 10 does this through two mechanisms: user ID and password, and RSA key pairs. User ID and password can be used as the only authentication, or can be coupled with the key pairs for signing and encryption for additional security. An entity's user ID and password identifies the entity to ESA 10, verifies the entity is a valid subscriber in ESA 10, and provides access to its key pairs. An entity's key pairs authenticate it to the rest of the world. Embodiments of ESA 10 maintain a store of an entity's current and expired key pairs, as well as a store of the X509 certificates the entity trusts and a store of the X509 certificates to whom it can send encrypted data.

Embodiments of ESA 10 use the Java Authentication and Authorization Service (JAAS) model. Authorization assures that an entity is allowed access to a protected asset, such as an API, in the case of the ESA administration API, or the File Adapter Constituent Desktop Application. Embodiments of ESA 10 use user ID to represent a JAAS Subject, and Groups to represent a JAAS Principal. Embodiments of ESA 10 manage user ID/group relationships, as well as group/application permissions. A user is authorized based on the roles to which he is assigned. A role in ESA terminology is a group. A user can belong to many groups. A group can contain many users. Examples of groups could include "Administrator", "User", "Monitor" and "Support." ESA 10 assigns permissions to groups. The permissions are assigned by application. That is, a group may have a File permission of "read/write" for application "A", but only "read" for application "B".

User credentials as defined by Embodiments of ESA 10 comprise user ID, a user's RSA key pair, its expired key pairs (for decrypting old data), the list of X509 certificates representing entities it trusts and the list of X509 certificates representing entities to whom it can send data. Entities in this context refer to anything identified by its X509 certificate, which can be another ESA user, or (as an example) a web service. User credentials also include the list of groups to which it belongs.

The ESA server handles X509 certificate subscriptions. An X509 subscription is based on the certificate Distinguished Name (DN). ESA X509 certificates have the following fields in their Distinguished Name, and the combination of these six fields are unique in the ESA universe:

1. CN—common name; example: CN=Bob Smith
2. OU—organization Unit; example: OU=Company Payroll
3. O—Organization; example: O=Company Inc.
4. L—location; example: L=Denver
5. ST—State; example: ST=Colorado
6. C—Country; example: C=United States An example of a Distinguished Name would be: "CN=Bob Smith, OU=Company Payroll, O=Company Inc., L=Denver, ST=Colorado, C=United States."

When a new X509 certificate is created, the publisher is notified of the new certificate. A subscription has the form:
UserTrustListX509CertifieateDistinguishedName
    Topic/*/*/*/*/*/* where UserTrustListX509CertificateDistinguishedNameTopic is the name of the topic. "*" is a wildcard for the fields defined in the DN, in the reverse order listed above. The above subscription matches every DN. For example, the following subscriptions would match the exemplary DN (the list is not exhaustive):
UserTrustListX509CertificateDistinguishedNameTopic/
    United States/*/*/*/*/*
UserTrustListX509CertificateDistinguishedName
    Topic/*/*/*/*/*/Bob Smith
UserTrustListX509CertifieateDistinguishedNameTopic/
    United States/Colorado/Denver/Company Inc./Company Payroll/Bob Smith ESA server 10 provides an independent authorization and authentication process. It can run alone on a remote machine to manage user credentials. An ESA server 10 can also participate in a publish/subscribe network, exchanging X509 certificates with other ESA servers through a special ESA server configured as a "publisher". An ESA publisher is an ESA server with an additional internal process that stores and manages subscriptions. Servers may be distributed, such as in different geographic locations, but the publisher is centralized. This allows for exchange of certificates between any combination of users in any location, so long as each is connected to at least one ESA server. The ESA servers themselves only need to be connected to at least one other ESA server in order to exchange all information.

Embodiments of ESA 10 support authentication by user ID and password. Each user has one active key pair and multiple possible expired key pairs associated with it. User IDs are managed with a GUI and accessed through an API. Applications can use the ESA API to authenticate their users and use the user ID's associated key pairs to authenticate the user ID to the rest of the world via digital signatures. ESA also supports the concept of roles or groups and their associations with users. These can be used for authentication. Groups can be associated with applications, object code (code bases or code sources) and permissions. This information can be used for authorization directly. ESA also supports the JAAS authentication/authorization model directly by automatic generation of Java policy files.

The records include:

1. User defines an individual user with its password, private key and certificate. The certificate for the user may be stored in this record.

2. ExpiredUser contains the previous user id, password, private key and certificate for a user. Data is encrypted with the current user encryption key.

3. Certificates contain the public certificates of interest, either for trust or encryption. This contains credentials required for sending data or for receiving data through the file adapter.

4. Group contains the group names, also known as Principals.

5. UserGroup relates users with groups. These are the groups to which a user belongs, or the Principals a user can have. This record is added with a method named associateUserWithGroup( ).

6. CodeBase contain the fully qualified jar files or directories being protected by JAAS.

7. GroupPermissions relate groups with the permissions a group has. This record is added with a method named associateGroupWithPermission( ).

8. CodeBaseGroup lists the codebases of interest for a group. This record is added with a method named associateCodebaseWithGroup( ).

9. UserTrustedCerts relate a user to the certificates the user trusts. This record is added with a method named associateUserWithTrustedCertificate( ).

10. UserAccessCerts relates a user to the certificates that can be used for encryption. This record is added with a method named associateUserWithCertificate( ).

11. Some records are used to generate policy files. These include: Group, CodeBase, Group Permissions, CodeBaseGroup.

Of course, in other embodiments, the records may include different and/or additional information. To summarize, the password, private key and certificate in the User record belong to the user, the certificates in UserTrustedCerts belong to other users and certificates in UserAccessCerts are the certificates of the others that the current user is allowed to send encrypted communication to.

Applications interact with ESA 10 via its API. The initial step is to login to the ESA 10. In some embodiments of ESA 10, User IDs and passwords are passed via Secure Socket Layer (SSL) VI. Additionally, the password is not passed directly, rather it is passed as a digest with a nonce. ESA 10 uses the nonce with its stored password to compare with the digest passed to it. If they match, the user is authenticated. The user's credentials are returned to the application encrypted with the user's password. This additional step is to avoid man-in-the-middle attacks for the login step.

Once the user has its credentials, the SSL VI connection is dropped. A SSL V3 (client authentication) connection to ESA 10 is established with the user's credentials, which include its private key as well as ESA's connection public certificate. Any further communication to ESA 10 is done through this second connection.

Embodiments of ESA 10 provide a publish and subscribe feature whereby applications can subscribe to information if the information has a publisher. Example of information ESA 10 publishes are new certificates and certificate revocation lists (CLRs). When a new user is defined to ESA 10, this user receives a newly generated public and private key. The public key, in the form of an X509Certificate, is sent to the ESA 10 certificate publisher which will send the certificate to whomever has registered interest in certificates from entities having specific characteristics, such as any employee of Company Inc. in Denver.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a plurality of security protocol information, each associated with a different one of a plurality of users, stored to computer-readable medium, the security protocol information for use in enabling bi-directionally secure communication between pairs of said plurality of users;
predefined rules stored to computer-readable medium;
at least one management server, said server operable to autonomously determine, from said predefined rules, ones of said plurality of users who are members of a secure communication group; and
said at least one management server further operable to distribute, to each of said ones of said plurality of users who are members of said secure communication group, said security protocol information associated with each other of said plurality of users who are members of said secure communication group.

2. The system of claim 1 wherein said hi-directionally secure communication comprises communication using two or more one-way directionally secure protocols.

3. The system of claim 1 wherein said security protocol information associated with one of said plurality of users comprises a digital certificate authenticating said one of said plurality of users with whom said security protocol information is associated.

4. The system of claim 3 wherein said security protocol information uses a public key encryption scheme.

5. The system of claim 4 further comprising an authentication step before a private key in said public key encryption scheme can be accessed.

6. The system of claim 5 wherein the authentication step includes verification of the condition of a physical item.

7. The system of claim 1 wherein said management server manages user accounts for said users.

8. The system of claim 7 wherein said at least one management server determines said ones of said plurality of users who are members of said secure communication group based at least in part on account status of said users.

9. The system of claim 7 wherein said at least one management server determines said ones of said plurality of users who are members of said secure communication group based at least in part on information identifying user accounts with one or more secure communication groups.

10. The system of claim 1 further comprising a second management server in communication with said at least one management server.

11. A system for managing bi-directional authentication comprising:
a plurality of security protocol information, each of said plurality of security protocol information comprising information for authenticating a different one of two or more subscribing users, said security protocol information stored to a computer-readable medium;
at least one server comprising a subscription manager, said subscription manager operable for autonomously managing distribution of said security protocol information among said users according to a set of rules defined for a user group, said set of rules stored to a computer-readable medium, wherein said server distributes, based on said set of rules, said security protocol information for authenticating each user of said user group to every other user of said user group, said distributed information permitting bi-directional authentication between ones of said users of said user group.

12. The system of claim 11 wherein said server distributes to at least a portion of said user group, based on said set of rules, updates to said security protocol information.

13. The system of claim 12 wherein said distributing updates comprises distributing changes in said information or account status for at least one of said users of said user group to other ones of said users of said user group, based on said set of rules.

14. The system of claim 13 wherein said changes comprise the addition of a new user account.

15. The system of claim 13 wherein said changes comprise the removal of authentication privileges for a user account.

16. The system of claim 11 wherein said security protocol comprises information that uniquely identifies each of said user accounts.

17. The system of claim 16 wherein said information comprises a digital certificate.

18. The system of claim 16 wherein said protocol uses a public key encryption scheme.

19. The system of claim 18 further comprising an authentication step before a private key in said public key encryption scheme can be accessed.

20. The system of claim 19 wherein the authentication step includes verification of the condition of a physical item.

21. The system of claim 11 wherein said bi-directional authentication comprises one-way authentication in each of two directions.

22. The system of claim 11 wherein one of said users obtains said information for at least one other of said users from said server.

23. The system of claim 11 wherein one of said users identifies criteria to the server for receiving said information for at least one other of said users.

24. The system of claim 23 wherein said criteria includes at least one characteristic of a said users.

25. The system of claim 24 wherein said at least one characteristic includes at least one selected from the group consisting of:
location, business relationship, and physical condition.

26. A method of distributing security protocol information for bi-directionally secure communication, said method comprising:
subscribing a plurality of users;
maintaining a database of currently-subscribed users;
generating security protocol information for said plurality of currently-subscribed users;

maintaining a set of rules stored to computer-readable medium, said rules governing distribution of said security protocol information among said plurality of currently-subscribed users;

autonomously determining by a server, for ones of said currently-subscribed users, selected others of said currently-subscribed users for whom said security protocol information is desired, wherein said determining is based at least in part on said rules; and autonomously distributing, from said server to said ones of said currently-subscribed users, said security protocol information for said selected others.

27. The method of claim 26 wherein said security protocol information comprises digital certificates.

28. The method of claim 27 further comprising:
updating said rules for newly added ones of said users.

29. The method of claim 27 further comprising:
updating said rules when ones of said users have a change in status.

30. A method of operating a server for managing secure communication, said method comprising:
generating security protocol information for each one of a plurality of subscribers;
maintaining rules for managing subscriber accounts;
autonomously determining, using said rules, a first group of said subscribers and a second group of said subscribers, wherein said security protocol information for each subscriber in said first group is to be distributed to each subscriber in said second group; and
autonomously distributing said security protocol information according to said determination.

31. The method of claim 30 wherein said security protocol information comprises digital certificates.

32. The method of claim 31 wherein said server manages key pairs for said digital certificates.

33. The method of claim 30 further comprising:
updating said rules when ones of said subscribers have a change in status.

34. The method of claim 30 wherein said server is a distributed server.

35. The method of claim 30 wherein said communication uses the interact.

36. The method of claim 30 further comprising:
accepting requests from ones of said subscribers, wherein said determining includes analyzing said requests using said rules.

37. The method of claim 30 further comprising:
requiring authentication before allowing ones of said subscribers to access said server.

38. The method of claim 37 wherein said authentication uses the Java Authentication and Authorization Service model.

39. The method of claim 30 further comprising:
autonomously issuing trust revocation notices for selected ones of said subscribers to selected others of said subscribers.

40. The method of claim 30 further comprising:
maintaining said subscribers as members in one or more user groups.

41. The method of claim 40 further comprising:
assigning roles to each of said subscribers according to membership in said user groups.

42. Computer-executable software code, embodied on a computer-readable medium, wherein when said code is executed by a processor-based device it causes the processor-based device to perform a method comprising:

generating a plurality of security protocol information, each associated with a different one of a plurality of users, said security protocol information stored to computer-readable medium;

maintaining predefined rules stored to computer-readable medium, said rules governing distribution of said security protocol information among said plurality of users;

determining from said predefined rules, for ones of said users, selected others of said users for whom said security protocol information is desired; and autonomously distributing to said ones of said users said security protocol information for said selected others.

43. The code of claim 42 wherein said security protocol information comprises digital certificates.

44. The code of claim 42, the method further comprising:
maintaining a database of said currently-subscribed users.

45. The code of claim 42, the method further comprising:
maintaining said set of rules governing said distribution of said protocol information.

46. The code of claim 42, the method further comprising:
updating said rules for newly added ones of said users.

47. The code of claim 42, the method further comprising:
updating said rules when ones of said users have a change in status.

48. The code of claim 42, the method further comprising:
autonomously issuing trust revocation notices for selected ones of said subscribers to selected others of said subscribers.

49. A method of operating a server for managing secure communication, said method comprising:
maintaining a database of a plurality of subscribers;
generating security protocol information for each one of said plurality of subscribers;
maintaining rules, stored to computer-readable medium, governing distribution of said security protocol information among said plurality of subscribers;
autonomously determining, using said rules, a first group of said subscribers and a second group of said subscribers, wherein said security protocol information for each subscriber in said first group is to be distributed to each subscriber in said second group; and
autonomously distributing said security protocol information according to said determination.

50. A method of managing distribution of security protocol information for bi-directionally secure communication, said method comprising:
maintaining as computer-readable data stored to a computer-readable medium identification of users who are members of a group, said group being a plurality of said users whom desire to perform hi-directionally secure communication with each other;
generating a plurality of security protocol information, each associated with a different one of the plurality of users, said security protocol information stored to computer-readable medium;
maintaining a set of rules stored to computer-readable medium, said rules governing distribution of said security protocol information among members of said group; and
autonomously managing, by a server, distribution of said security protocol information among members of said group in accordance with said rules.

51. The method of claim 50 wherein said autonomously managing further comprises:
receiving, by said server, a request to add a prospective user as a member of said group;

generating security protocol information associated with said prospective user, said security protocol information stored to computer-readable medium; and responsive to acceptance of the prospective user as a member of said group, said server autonomously distributing to members of the group the security protocol information associated with the accepted prospective user in accordance with said rules, and said server autonomously distributing to the accepted prospective user the security protocol information associated with the members of the group in accordance with said rules.

52. The method of claim 50 wherein said rules comprise user preferences defined for one or more of said members.

* * * * *